No. 630,876. Patented Aug. 15, 1899.
W. C. FORCE.
TOOL HOLDER.
(Application filed Feb. 4, 1898.)
(No Model.)
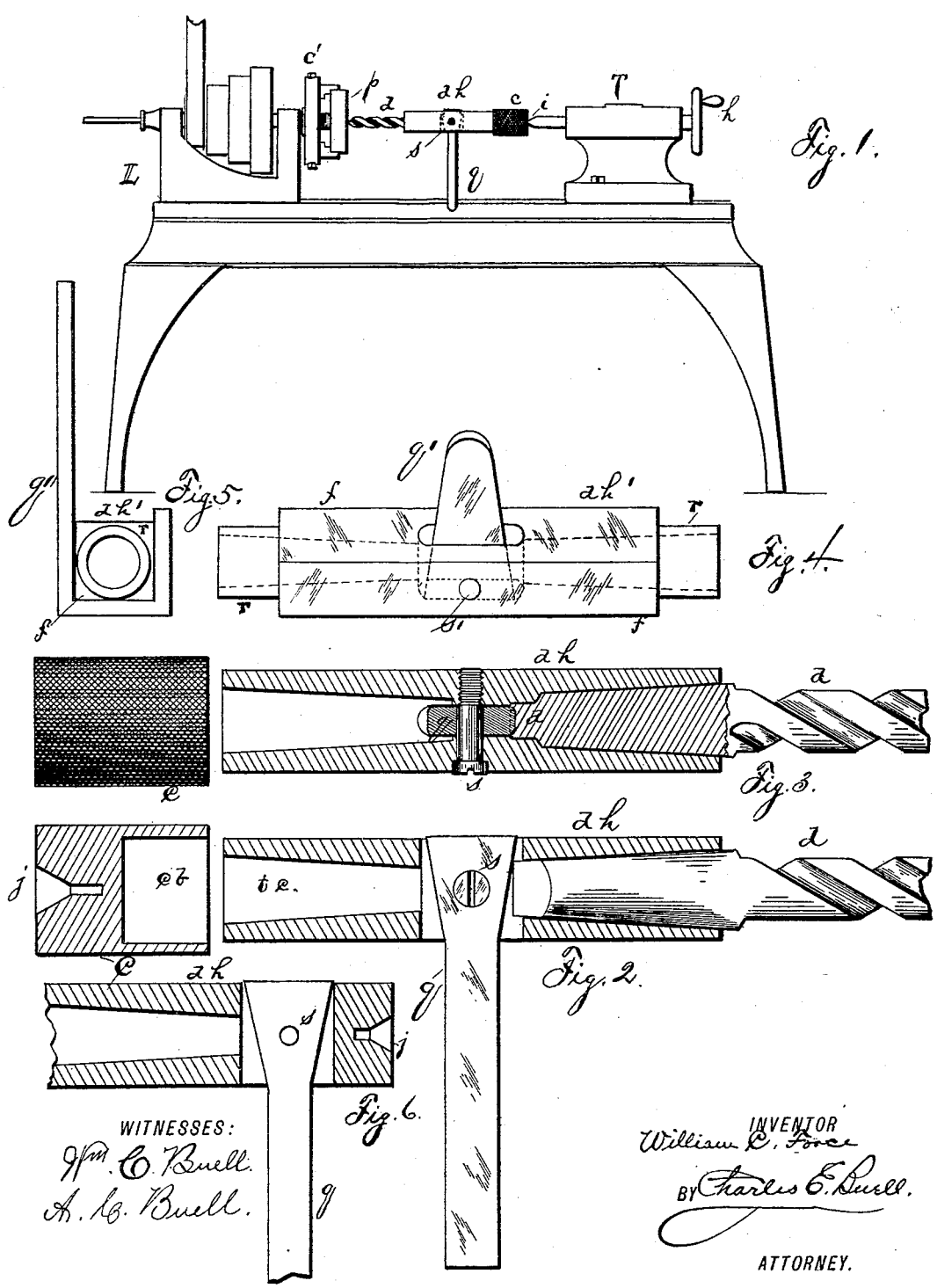
WITNESSES:
Wm. C. Buell.
A. C. Buell.
INVENTOR
William C. Force
BY Charles E. Buell.
ATTORNEY.

UNITED STATES PATENT OFFICE.

WILLIAM C. FORCE, OF NORTH PLAINFIELD, NEW JERSEY.

TOOL-HOLDER.

SPECIFICATION forming part of Letters Patent No. 630,876, dated August 15, 1899.

Application filed February 4, 1898. Serial No. 669,068. (No model.)

*To all whom it may concern:*

Be it known that I, WILLIAM C. FORCE, of North Plainfield, Somerset county, State of New Jersey, have invented Improvements in Tool-Holders, of which the following is a specification.

My invention consists, primarily, in the combination, with a holder for tools used for drilling, reaming, and counterboring, of a supporting-piece that is portable with the said holder and that is adapted to be operated to forcibly remove the tool from the holder when desired, substantially as hereinafter described.

My invention further consists in combinations and subcombinations to be hereinafter described.

In the accompanying drawings, Figure 1 shows a lathe equipped with a drill in a holding device that is arranged according to my invention. Figs. 2 and 3 show a tool-holder in enlarged view in longitudinal section that embodies my invention. Fig. 4 shows a modified form of such device, a detailed view of the same being shown in Fig. 5. A further modification of the invention is set forth in Fig. 6.

Referring to Fig. 1, there is shown a lathe L, in which a well-known form of drill is held against plate $p$, which plate is to be drilled, the plate $p$ rotating with the chuck $c'$, in which it is secured, the drill and tool-holder $d\ h$ being stationary. The holder $d\ h$ is provided with the centering-cap $c$, that is adapted to receive the point $i$ of tailpiece T, and by means of the said tailpiece T the drill is held against the plate $p$ with a uniform and effective pressure for drilling the said plate $p$. By means of the piece $q$, which is secured in the holder $d\ h$ by screw $s$, the holder $d\ h$ and the drill $d$ are prevented from turning as the said piece $q$ comes into contact with the frame of the lathe. By employing the screw-pivot $s$ any tendency to spread the holder at its center by the pressure of the tool is prevented by the said screw.

In the enlarged views in Figs. 2 and 3 the piece $q$ is shown secured by a screw in a straight-sided recess in the body of the said holder $d\ h$ and the piece $q$ is shown as tapering, and the socket which contains the drill $d$, as also the one in the opposite end of the holder $d\ h$, is tapered, and the head of piece $q$ in the holder is tapered, so that the tang of the drill $d$ has a slight point of contact with the piece $q$, and thereby the said piece $q$ can be used to force the drill $d$ from its tapered socket more readily than if the said piece $q$ were straight and not tapered, as shown. It is customary to employ a wedge-like metal bar driven into a recess back of the drill to force the drill out when it is desired to remove such drill from its socket; but the piece $q$ being adapted to be portable with the holder, in addition to its office of preventing the turning of the holder $d\ h$ while the process of drilling proceeds, serves a better purpose than the ordinary drifting-bar for removing a drill from its socket in that it is always at hand and the time usually expended in finding a suitable wedge-like bar for such purpose is saved.

By employing the screw $s$ for the pivot of the drifting-lever $q$ the holder $d\ h$ is strengthened and prevented from spreading when the strain of the contact with the lathe-frame is taking place, as might otherwise occur.

The tool-holder $d\ h$ is provided with a tapering socket at each end and is shown as having the said tapering sockets of different diameters, so that two sizes of drills can be used in a holding device successively. The said holding device would be lacking in its completeness without the cap $c$, which is shown in Fig. 2 with a recess that is counterbored therein and adapted to closely fit the holder $d\ h$ and is provided with a countersunk cavity for the reception of the point $i$ of the tailpiece T of lathe L and to so receive the said point I as to avoid a contact of the extreme point with the said centering-cap $c$. In Fig. 3 the said centering-cap $c$ is shown as knurled or roughened upon its exterior to facilitate its removal from the closely-fitting holder $d\ h$.

In Fig. 4 there is shown a square form of holder $d\ h$, with its ends rounded at $r\ r$ and a piece $q'$ in a recess, similar to the arrangement shown in Fig. 2 and described, the piece $q'$ being short and the wrench or spanner $q''$ adapted to fit upon the square portion of $d\ h$ and to rest against the frame of lathe L to prevent the turning of said holder. A cap (not shown) is provided for fitting the rounded portions of the holder. The wrench $q''$ serves to rap the piece $q'$ when the drill is to be removed from its socket, while in the form shown in Fig. 2 the lever-like piece $q$ can be struck with the hand for accomplishing a like result.

The advantages of this device over those heretofore known and used are the increased facility with which a tool is placed in position for drilling, reaming, or counterboring and the improved manner of holding the tool from turning, together with the saving in time and labor in the removal of a tool from the holder and the insertion of another tool in its place.

Fig. 6 shows a holder with a single cavity for receiving a drill or like tool that is provided with a piece $q$ for giving support to the holder $d\ h$ when in the lathe and for facilitating the removal of the drill from the said holder, as described, but which is adapted to be used without a centering-cap $c$ by being provided with a solid end having a countersunk cavity for receiving the point I, the said cavity being marked $j$. This form of the device admits of employing but one size of drill; but it comprises the very desirable combination of the piece $q$, secured therewith, for the several purposes for which such piece $q$ is added to the said tool-holder $d\ h$, and for certain uses such simple form is desirable and affords results not found in the heretofore known appliances employed for holding tools.

What I claim is—

1. A tool-holder having a drill-receiving socket, a supporting-piece pivoted in said holder in a manner to serve as a lever for forcibly removing a tool from said holder, the said piece projecting from the said holder and adapted to make contact with the frame of a lathe, substantially as described.

2. A tool-holding device having a socket, or sockets therein, a drifting-lever pivoted in said device and adapted to be forced against a tool held in said device, and a cap for centering the device in a lathe, substantially as described.

3. A tool-holding device having a tapered socket in each end thereof, a drifting-lever pivoted in a recess in the center of said device, and a cap adapted to be fitted upon either end of said tool-holding device, substantially as described.

4. A tool-holding device having a tapered socket for receiving a tool, a drifting mechanism pivoted in said device, means for making contact between the said device and the frame of a lathe, and mechanism for centering the said tool-holding device in a lathe, substantially as described.

5. A tool-holding device comprising the following elements, one or more tapering sockets, a pivoted drifting-lever, a means for making contact between the said holding device and the frame of a lathe, and added means for centering the said holding device in a lathe, substantially as described.

6. A tool-holder having a socket, or sockets, therein, a drifting-lever pivoted in said device by a screw or a pivot that is adapted to strengthen the said tool, and means for centering the said holder in a lathe, as and for the purpose set forth.

WILLIAM C. FORCE.

Witnesses:
CHARLES E. BUELL,
WM. C. BUELL.